United States Patent [19]
Luebke et al.

[11] Patent Number: 6,040,379
[45] Date of Patent: Mar. 21, 2000

[54] STARCH COPOLYMER PRODUCTS AND PROCESS

[75] Inventors: Gary Luebke, Olathe, Kans.; Kenneth Curtis Benton, Cedar Rapids; Yakov A. Letuchy, Iowa City, both of Iowa

[73] Assignee: Penford Corporation, Bellevue, Wash.

[21] Appl. No.: 09/133,625

[22] Filed: Aug. 13, 1998

Related U.S. Application Data

[60] Provisional application No. 60/055,841, Aug. 15, 1997.

[51] Int. Cl.⁷ .................................................. C08L 3/04
[52] U.S. Cl. .................. 524/734; 525/54.24; 525/54.26; 526/238.22; 527/313; 527/314
[58] Field of Search ..................... 526/238.22; 525/54.24, 525/54.26; 524/734; 527/313, 314

[56] References Cited

U.S. PATENT DOCUMENTS

| | | | |
|---|---|---|---|
| 4,069,177 | 1/1978 | Smith | 525/54.32 |
| 4,301,017 | 11/1981 | Kightlinger et al. | 252/8.83 |
| 4,375,535 | 3/1983 | Kightlinger et al. | 527/313 |
| 4,560,724 | 12/1985 | Brabetz et al. | 524/734 |
| 5,003,022 | 3/1991 | Nguyen et al. | 527/300 |
| 5,130,394 | 7/1992 | Nguyen et al. | 527/300 |
| 5,130,395 | 7/1992 | Nguyen et al. | 527/300 |
| 5,416,181 | 5/1995 | Nguyen et al. | 527/300 |
| 5,525,414 | 6/1996 | Wagers et al. | 428/265 |
| 5,536,764 | 7/1996 | Nguyen et al. | 524/53 |
| 5,707,720 | 1/1998 | Fox | 428/245 |
| 5,800,870 | 9/1998 | Luebke et al. | 427/369 |

OTHER PUBLICATIONS

Petrolite Corporation v. Watson (DC DC) 113 USPQ 248, Mar. 14, 1957.
Austenal Laboratories, Incorporated v. Nobilium Processing Company of Chicago et al. (DC NILL) 115 USPQ 44, Jun. 5, 1957.

*Primary Examiner*—Peter A. Szekely
*Attorney, Agent, or Firm*—Marshall, O'Toole, Gerstein, Murray & Borun

[57] ABSTRACT

The invention provides methods for the preparation of a starch copolymer product which is the reaction product of starch and one or more synthetic monomers capable of undergoing free radical polymerization wherein the reaction product is in the form of an emulsion or dispersion having weight-average particle sizes less than 180 nm as measured by Capillary Hydrodynamic Fractionation. The method includes the steps of: (a) dissolving or colloidally dispersing starch in an aqueous solvent to form a starch solution or dispersion; (b) heating the starch solution or dispersion to a specified temperature range; (c) adding to the starch solution or dispersion a first portion of the synthetic monomer and a free radical initiator for initiation of polymerization of the starch member and the synthetic monomer; and (d) after free radical polymerization of the synthetic monomers has been initiated in the presence of the starch, adding additional portions of synthetic monomers capable of undergoing free radical polymerization to the starch solution or dispersion. The invention also provides improved methods for the preparation of starch copolymer products utilizing wet adhesion monomers and improved industrial and architectural coatings containing the resulting starch copolymer products.

38 Claims, No Drawings

STARCH COPOLYMER PRODUCTS AND PROCESS

This application claims priority on Provisional Application Ser. No. 60/055,841 filed Aug. 15, 1997.

BACKGROUND OF THE INVENTION

The present invention relates to starch copolymers, prepared by the polymerization of styrene, butadiene, and/or other vinyl monomers in the presence of a colloidally-dispersed starch. Reaction products of starch with vinyl monomers are articles of commerce and have found use as binders in paper sizing and coating compositions and as components in textile sizing formulations. U.S. Pat. No. 5,003,022, the disclosure of which is hereby incorporated by reference herein discloses the preparation of such products by (1) dispersing a starch or starch derivative of specified molecular weight in water using heat and agitation, (2) adding a free radical initiator, (3) adding all monomer(s), and (4) heating to cause the decomposition of the initiator and subsequent polymerization of the monomers, While the patent states that the monomer or monomers can be added at the beginning or during the course of polymerization it exemplifies the batch polymerization system disclosed above.

Such batch polymerization systems have long been used, and they offer the advantage of simplicity. However, they are not very versatile, and are not well-suited to producing the best product uniformity, smallest particle size, or most uniform particle size distribution.

It is one object of the present invention to provide a process for starch copolymer manufacture which yields a starch copolymer latex of weight-average particle size less than 180 nm, as measured by the capillary hydrodynamic fractionation (CHDF) technique. Another object of the invention is to provide a process for the manufacture of starch copolymers which allows the safe use of highly active monomers. Still another object of the invention is to provide products prepared by such a process that are useful in sizing paper and paper products, as components in textile fiber and warp sizes, as adhesives, and as binders in surface coating compositions for architectural and industrial applications.

It is still another object of the invention to provide latex paints as industrial and architectural coatings with improved gloss and "open time." "Open time" is the period during which the paint film can be repaired or blended into an adjacent area without showing brush marks, the edge of the film, or other blemishes.

It is further desired to produce industrial and architectural coatings having improved water resistance and wet rub resistance. Other objects and advantages of the invention will become apparent from the following disclosure and illustrative examples.

SUMMARY OF THE INVENTION

The present invention provides improved methods for the polymerization of styrene, butadiene, acrylates and other synthetic monomers in the presence of starch to produce starch copolymer products. According to a first aspect of the present invention a semi-continuous process is provided for polymerization of synthetic monomers in the presence of starch which provide improvements in the products produced thereby including, but not limited to, improvements in particle size distribution.

As a first aspect, the invention provides a process for the preparation of a starch copolymer product which is the reaction product of starch and one or more synthetic monomers capable of undergoing free radical polymerization wherein said reaction product is in the form of an emulsion or dispersion having weight-average particle sizes less than 180 nm as measured by Capillary Hydrodynamic Fractionation comprising the steps of: (a) dissolving or colloidally dispersing starch in an aqueous solvent to form a starch solution or dispersion; (b) heating the starch solution or dispersion to a specified temperature range; (c) adding to the starch solution or dispersion a first portion of said synthetic monomer and a free radical initiator for initiation of polymerization of the starch member and said synthetic monomer; and (d) after free radical polymerization of said synthetic monomers has been initiated in the presence of said starch, adding additional portions of synthetic monomer capable of undergoing free radical polymerization to the starch solution or dispersion wherein at least 75% of the total synthetic monomer to be reacted with said starch is added more than one hour after initiation of said free radical polymerization. More preferably at least 50% of the total synthetic monomer reacted with the starch is added more than 2 hours after initiation of the free radical polymerization with between 50% and 75% of the total synthetic monomer to be reacted with the starch added at least 2 hours after initiation of the free radical polymerization being most preferred.

According to a preferred embodiment of this first aspect of the invention, the dissolved or colloidally-dispersed starch derivative is heated to 70° C. to 95° C. prior to the start of the polymerization. According to preferred embodiment of this second aspect of the invention the initiator is added to the dissolved or colloidally-dispersed starch derivative before the addition of monomers. Preferably, 2% to 50% of the total initiator charge is added to the dissolved or colloidally-dispersed starch derivative before the addition of monomers. Moreover, according to one preferred aspect of the invention a sequestering agent and/or buffer is added to the dissolved or colloidally-dispersed starch derivative before the addition of synthetic monomers.

According to a further preferred embodiment of this first aspect of the invention additional free radical initiator is added throughout the course of the polymerization reaction.

The products of the first aspect of the invention are characterized by improved particle size distributions and other properties. Such products are contemplated to be useful as binders for paper products including surface sizing binders and coating binders. The products are also contemplated to be useful as binders in textile sizes including sizes for natural, synthetic, and mixed textile fibers and fabrics.

The products of the methods of the invention are also contemplated to be useful as binders for industrial or architectural coatings including those selected from the group consisting of paints, varnishes, and stains. Further, the products of the methods of the invention are also contemplated to be useful as binder components of adhesives.

According to a second aspect of the invention, improvements are made in processes for the preparation of starch copolymer products utilizing wet adhesion monomers to provide improved properties to the products. Specifically, it has been found that if a wet adhesion monomer is blended with the starch solution or dispersion alone or optionally with other synthetic monomers to form an emulsion before initiation of the polymerization that improved film properties are provided to the resulting reaction product. Thus, the resulting films are characterized by improved gloss and open time compared to films wherein the starch copolymer product was produced with wet adhesion monomer incorporated into the reaction mixture but wherein the monomers were not pre-blended (or pre-emulsified) with the starch component of the reaction mixture. An additional advantage of the process is the reduction in the amount of coagulum formed when the monomers are blended with the starch solution or dispersion before the initiation of the polymerization, compared with the process in which the monomers are not pre-emulsified.

Specifically, the invention provides in a process for the preparation of a starch copolymer product which is the reaction product of starch and one or more synthetic monomers capable of undergoing free radical polymerization comprising the steps of: (a) dissolving or colloidally dispersing starch in an aqueous solvent to form a starch solution or dispersion; (b) adding to the starch solution or dispersion a synthetic monomer and a free radical initiator for initiation of polymerization of the starch component and said synthetic monomer; and (c) carrying out a free radical polymerization of said monomers in the presence of said starch; the improvement comprising: blending a wet adhesion monomer with said starch solution or dispersion prior to adding the free radical initiator to said starch solution or dispersion. Wet adhesion monomers useful for practice according to the methods of the invention include blends of methacrylamidoethylethyleneurea with methacrylic acid which is available commercially as Sipomer WAM II (Rhone-Poulenc) and behenyl ethoxymethacrylate. Further, the starch and aqueous solvent are preferably heated to promote formation of said solution or dispersion and the solution or dispersion is cooled to a specified temperature range which is preferably about 20° to 60° C. with 25° C. to 30° C. being particularly preferred prior to blending with the wet adhesion monomer.

According to a third aspect of the present invention, improved industrial and architectural coatings are provided which comprise as a binder, a starch copolymer product which is the reaction product of starch and one or more synthetic monomers capable of undergoing free radical polymerization wherein said reaction product is in the form of an emulsion or dispersion having weight average particle sizes greater than 120 nm as measured by Capillary Hydrodynamic Fractionation with particle sizes greater than 120 nm being particularly preferred. Preferred coatings according to this aspect of the invention are those selected from the group consisting of paints, varnishes and stains.

As a surprising aspect of the invention, it has been found that high gloss industrial and architectural coatings can be obtained which comprise s binders starch copolymer products having weight average particle sizes greater than 120 nm. The use of such materials as binders, and in particular hose starch copolymer products comprising acrylates surprisingly provides high gloss to industrial and architectural coatings such as paints. This is surprising given the general preference in the art for binder particle sizes of less than 100 nm and most preferably about 80 nm. Moreover, the use of binders comprising average particle sizes greater than 120 nm provides for coating formulations having lower viscosities at higher solids levels and further provides improved coverage and open time for paint formulations.

DETAILED DESCRIPTION OF THE INVENTION

It has been found that the methods of the invention of carrying out the polymerization reaction of synthetic monomers with starch under semi-continuous conditions provides improvements in the quality of the reaction product. Specifically, co-adding monomers and initiator to a vessel containing a solution or a colloidal dispersion of starch such that polymerization occurs at a high rate and there is little or no significant accumulation of unpolymerized monomers in the reactor leads to starch copolymer emulsions or dispersions of significantly smaller particle size than those produced by batch processes. The methods of the invention have further provided the surprising result that the particle size of the starch copolymer emulsions or dispersions is relatively independent of the weight ratio of the synthetic polymer component to starch, and even of the choice of monomers. The methods of the invention also allow the use of highly active monomers, such as esters of acrylic and methacrylic acid, which cannot be polymerized safely in a batch system due to their tendency to exhibit the well-known Tromsdorff effect.

The invention further provides improved methods for the preparation of a starch copolymer product which is the reaction product of starch and one or more synthetic monomers capable of undergoing free radical polymerization comprising the steps of: (a) dissolving or colloidally dispersing starch in an aqueous solvent to form a starch solution or dispersion; (b) adding to the starch solution or dispersion a synthetic monomer and a free radical initiator for initiation of polymerization of the starch component and said synthetic monomer; and (c) carrying out a free radical polymerization of said monomers in the presence of said starch; the improvement comprising: blending a wet adhesion monomer with said starch solution or dispersion prior to adding the free radical initiator to said starch solution or dispersion. The invention further provides improved industrial and architectural coatings comprising binders therein a starch copolymer product which is the reaction product of starch and one or more synthetic monomers capable of undergoing free radical polymerization wherein said reaction product is in the form of an emulsion or dispersion having weight average particle sizes greater than 120 nm as measured by Capillary Hydrodynamic Fractionation.

Starches and starch derivatives suitable for use in this process may be derived from any botanical source, such as corn or maize, potato, tapioca, banana, wheat, rice, amaranth, and sorghum. The starch is preferably derivatized by the introduction of functional groups and the molecular weight modified to a specified range, as will be described and defined herein.

As used herein "starch" refers to starch, modified starch and starch derivatives. Suitable starch derivatives include those wherein the starch is a starch derivative modified by acid hydrolysis, enzymolysis, oxidation, or sonication. Suitable functional derivative groups include alkyl, alkenyl, aryl, arylalkyl, arylalkenyl, cycloalkyl, and cycloalkenyl ethers, hydroxyethers, esters including organic acid esters, amides, ketones, acetals, and ketals, and derivatives thereof, carboxylates, phosphates, sulfates, sulfonates, amino, and quartenary ammonium groups, and combinations thereof. Preferred derivative groups include alkyl, alkenyl, aryl, arylalkyl, arylalkenyl, cycloalkyl, and cycloalkenyl ethers, hydroxyethers, esters, carboxylates and phosphates. Especially preferred are the benzyl, allyl, hydroxyethyl, hydroxypropyl, hydroxybutyl, and 2-hydroxy-3-butenyl ethers, formate, acetate, propionate, butyrate, dodecanoate, and stearate esters, alkenyl succinate esters, carboxylic acid, carboxymethyl, and carboxyethyl derivatives, and combinations thereof.

Particularly preferred starch derivatives suitable for use according to the invention include those incorporating allyl ether, benzyl ether, hydroxyethyl ether, hydroxypropyl ether, hydroxybutyl ether, 2-hydroxy-3-butenyl ether, formate, acetate, propionate, butyrate, dodecanoate, octadecanoate, alkyl succinate or alkenyl succinate ester, carboxylate, ketone, and aldehyde. A particularly preferred starch is an acid-modified hydroxyethyl starch.

Preferred starch derivatives for use according to the invention further include those wherein the molecular weight of the starch derivative is modified to a molecular weight, as measured by the intrinsic viscosity in an aqueous solution at 25° C. in the range of $[\eta]_0$=0.07–0.35 dl/g or more preferably those in the range of $[\eta]_0$=0.16–0.35. According to one aspect of the invention the molecular weight of the starch derivative is further modified prior to the start of the polymerization stage and/or after step (a) by enzymolysis to a preferred range of $[\eta]_0$=0.07–0.15 dl/g.

These substituents are introduced by reactions and processes known in the art. For example, the derivatization may be carried out by reactions on the granular starch in a slurry in aqueous or organic solvents, or in the "dry" state, or on starch molecules colloidally dispersed in aqueous or organic solvents.

The starch molecular weight may be modified by any known method, such as acid hydrolysis, enzymolysis, oxidation, or sonication, or combinations thereof. Typical reagents used include the mineral acids, α-amylase, alkali and alkaline earth hypochlorites, peroxydisulfates and permanganates, organic peroxides, hydroperoxides, and the like. Preferred reagents include hydrochloric and sulfuric acids, α-amylase, sodium hypochlorite, calcium hypochlorite, ammonium peroxydisulfate, sodium peroxydisulfate and potassium peroxydisulfate.

The method, or combination of methods selected, and whether the modification is performed before or after the introduction of the functional substituent group, will depend somewhat on the choice of the substituent. For example, enzymolysis or sonication might be used for modifying the molecular weight of a starch ester, or the starch could be modified by acid hydrolysis prior to the introduction of the ester groups. In one preferred embodiment, a hydroxyethyl-substituted starch is subjected to acid hydrolysis in the granular state, and is then colloidally dispersed in an aqueous medium and optionally further modified by enzymolysis.

For the purposes of the present invention, the starch molecular weight is defined by the intrinsic viscosity, $[\eta]_0$, in water at 25° C. in dl/g, according to the method set out in Kightlinger et al., U.S. Pat. No. 4,301,017. The preferred range of the intrinsic viscosity is 0.07 to 0.35 dl/g under the above specified conditions with the range of $[\eta]_0$=0.16–0.35 dl/g being preferred.

Synthetic monomers useful according to the methods of the invention include those selected from the group consisting of α-olefins, conjugated and nonconjugated dienes, vinyl aromatic compounds, acrylic acid, methacrylic acid, itaconic acid, $C_1$ to $C_{18}$ esters of acrylic, methacrylic, and itaconic acid, behenyl ethoxyl methacrylate, vinyl esters of $C_1$ to $C_{18}$ organic acids, acrylonitrile, acrylamide, and $C_1$–$C_{18}$ N-substituted and N,N-disubstituted acrylamides, and methacrylamidoethylethyleneurea.

Prefered monomers include, but are not limited to, styrene, p-methylstyrene, p-t-butylstyrene, p-methoxystyrene, vinyl toluene, vinyl aphthalene, and divinyl benzene; isobutylene, 4-methyl-1-pentene, 1,3-butadiene, 2-methyl-1,3-butadiene, 1,4-hexadiene, and 5-ethylidene-2-norbornene; acrylic acid, methacrylic acid, itaconic, acid, and their $C_1$ to $C_{18}$ alkyl, cycloalkyl, alkenyl, aryl, arylalkyl, and arylalkenyl esters; methyl acrylate, ethyl acrylate, n-butyl acrylate, i-butyl acrylate, 2-ethylhexyl acrylate, methyl methacrylate, ethyl methacrylate, i-butyl metbacrylate, isobornyl methacrylate, phenyl methacrylate, lauryl methacrylate, behenyl ethoxyl methacrylate, ethylene glycol diacrylate and ethylene glycol dimethacrylate; the $C_1$ to $C_{18}$ alkyl esters of maleic and fumaric acids; acrylonitrile; vinyl acetate, vinyl butyrate, vinyl stearate, and sodium vinyl sulfonate; methyl vinyl ether, ethyl vinyl ether, and i-butyl vinyl ether; methyl vinyl ketone; acrylamide, N-methylacrylamide, N,N-dimethylacrylamide, N-t-butylacrylamide, N-t-octylacrylamide, and N-methylolacrylamide, methacrylamidoethylethyleneurea, vinyl chloride, vinylidene chloride, vinyltrimethylsilane, m-isopropylidene-dimethylbenzyl isocyanate, and the like, and mixtures thereof.

More preferred are the synthetic monomers selected from the group consisting of isobutylene, 1,3-butadiene, 2-methyl-1,3-butadiene, styrene, p-methylstyrene, divinylbenzene, acrylic acid, methacrylic acid, itaconic acid, methyl acrylate, ethyl acrylate, n-butyl acrylate, 2-ethylhexyl acrylate, methyl methacrylate, ethyl methacrylate, i-butyl methacrylate, isobornyl methacrylate, lauryl methacrylate, behenyl ethoxyl methacrylate, ethylene glycol diacrylate, ethylene glycol dimethacrylate, vinyl acetate, acrylonitrile, acrylamide, N-t-butylacrylamide, N-t-octylacrylamide, and N,N-dimethylacrylamide with the combinations of either styrene and 1,3-butadiene or of butyl acrylate, methyl methacrylate, methacrylamidoethylethyl-eneurea and methacrylic acid being most preferred.

The monomers may be added to the reactor continuously throughout the course of the polymerization, or in increments at specified time intervals. Alternatively, an initial portion of the monomers may be charged to the reactor, and the remainder may then be added continuously or in increments over a specified time interval. Preferably, at least 75% of the total synthetic monomer to be reacted with said starch is added more than one hour after introduction of a first portion of the synthetic monomer and initiation of the free radical polymerization. More preferably at least 50% of the total synthetic monomer reacted with the starch is added more than 2 hours after initiation of the free radical polymerization with between 50% and 75% of the total synthetic monomer to be reacted with the starch added at least 2 hours after initiation of the free radical polymerization is most preferred.

The amount of vinyl monomers used relative to the starch may vary from about 5 parts by weight (pbw) monomers to 95 pbw starch to as high as about 98 pbw monomers to 2 pbw starch. Preferred monomers to starch ratios are in the range of 20:80 to 98:2. Especially preferred are monomers to starch ratios in the range of 40:60 to 95:5 parts by weight.

Free radicals to initiate the polymerization of these monomers may be generated by many techniques, including the thermal and induced decomposition of precursor species, ionizing radiation, ultrasound, and the like, and combinations thereof. The preferred method is by the thermal or induced decomposition of free radical-generating precursor species, hereinafter referred to as initiators.

Initiators may be of the water-soluble or oil-soluble types, and may include hydrogen peroxide, organic peroxides, hydroperoxides, peroxyacids, peroxyesters, peroxydicarbonates, peroxydisulfates, azonitriles. halogens and halocarbons. Examples include, but are not restricted to, hydrogen peroxide, benzoyl peroxide, lauroyl peroxide, cumene hydroperoxide, peracetic acid, i-amyl peroxypivalate, n-propyl peroxydicarbonate, ammonium peroxydisulfate, sodium peroxydisulfate, potassium peroxydisulfate, α, α'-azobis-(i-butyronitrile), and the like. Preferred initiators include hydrogen peroxide, benzoyl peroxide, lauroyl peroxide, i-amyl peroxypivalate, sodium peroxydisulfate, potassium peroxydisulfate, and a,a'-azobis-(i-butyronitrile). The choice of initiator is dependent upon the anticipated reaction conditions, especially the desired temperature and time. For the purposes of the present invention, hydrogen peroxide and sodium or potassium peroxydisulfate are especially preferred.

The azo- and peroxy-initiators may be decomposed to produce free radicals by heating at an appropriate temperature. If a lower reaction temperature is desired, the peroxygenated compounds may also undergo induced free radical generation when treated with a reducing agent.

A wide variety of reducing agents are suitable for use with the peroxygenated initiators. However, the choice is usually spmewhat specific to the selected initiator. For example, $Fe^{+2}$ salts are the most effective with hydrogen peroxide, while sodium bisulfite is often selected for use with peroxydisulfates, and organic polyamines are preferred with organic hydroperoxides.

The initiator may be introduced to the reactor in several ways. It may all be added at the beginning of the reaction, before any monomer is added to the reactor. Alternatively, a portion may be added initially, and the remainder added continuously or in increments throughout the course of the polymerization. Again, the entire amount may be added continuously or incrementally with the monomers. For reasons of safety, it is preferred to add the monomers and initiator in separate streams, and not to mix these components prior to their introduction to the reactor.

Other components of the system may include buffers or agents to control or restrict the variation of the pH, surfactants, defoamers, biocides, odor control agents, optical brighteners, and so forth. These may be added initially, during the course of the reaction, or upon completion of the polymerization, depending upon their intended use and interactions with other components of the system.

The reaction temperature may vary, depending on the choice of the initiator to be used, the reaction medium, the desired reaction time, monomer feed rates, the reactivity of the monomers, and so on. For the purpose of the instant invention, the selected temperature may range from 25 to 100° C., preferably from 40 to 95° C., and especially from 70 to 95° C.

The reaction is normally run at the natural pressure of the system at the polymerization conditions, i.e., neither a superelevated nor a reduced pressure is required. In the case of low-boiling or gaseous monomers, such as 1,3-butadiene, the vapor pressure of the monomer at the reaction temperature is considered the "natural" pressure of the system.

The following examples are illustrative, and are not intended to limit either the scope or spirit of the invention.

EXAMPLE 1

COMPARATIVE EXAMPLE A

This example illustrates the preparation of a starch copolymer composed of about 50% by weight of starch and 50% by weight of copolymerized styrene and 1,3-butadiene in a 60:40 wt./wt. ratio, by batch polymerization at 70° C.
Part A: Preparation of Starch Dispersion
A hydroxyethylated, acid-modified starch (about 1.85 wt. % hydroxyethyl content, $[\eta]_0$ about 0.23 dl/g, 91. 1% non-volatile matter), 650 g, was dispersed with agitation in about 975 g of water containing calcium ions, and the mixture was heated to about 97° C. and held at that temperature for about 36 minutes. The resulting starch paste was cooled to about 89° C., about 0.2 ml of α-amylase solution was added, and heating and agitation continued for about 83 minutes. About 3 g of sodium hypochlorite (about 16.5% active chlorine) was added to destroy the enzyme, and the paste was cooled to about 40° C. The starch content of the paste was 37.8% by weight and $[\eta]_0$ about 0.08 dl/g.
Part B: Preparation of Starch Copolymer
To a 2-1 stainless steel pressure reactor were added about 1071 g of the starch paste prepared according to Part A, 323 g of deionized water, 1 g of ethylene diamine tetraacetic acid disodium, salt, 4.05 g of potassium persulfate, and 2.43 g of sodium bicarbonate. The mixture was purged with nitrogen for about 10 minutes. Then 243 g of styrene were added, and the reactor was purged for 10 minutes with nitrogen. The head of the reactor was clamped in place, and the reactor was then purged for an additional 15 min. with nitrogen, and pressurized to 120 psig with nitrogen. The pressure was released and a vacuum was applied for 5 minutes. Then, 162 g of 1,3-butadiene were added to the reactor from a sample cylinder; the pressure was about 22 psig at the ambient conditions.

The agitator was started, and the reactor was heated according to the following schedule: ambient temperature to 60° C. in 30 minutes, 60° C. to 63° C. in 30 minutes, 63° C. to 67° C. in one hour, 67° C. to 70° C. in one hou held for eight hours at 70° C., cooled from 70° C. to 25° C. in 30 minutes. The final product was about 44.9% solids. The weight-average particle diameter was about 215 nm as determined by capillary hydrodynamic fractionation.

EXAMPLE 2

COMPARATIVE EXAMPLE B

The procedure of Example 1 was repeated, but with the potassium persulfate concentration increased to 1.5 wt. %. The final product was about 39.4 wt. % solids, and the weight average particle size was about 180 nm.

EXAMPLE 3

This example illustrates the preparation of a starch copolymer composed of about 50% by weight of starch and about 50% by weight of copolymerized styrene and 1,3-butadiene in a 60:40 wt./wt. ratio, with continuous addition of the monomer and initiator at 70° C.
Part A: Preparation of Starch Dispersion
A hydroxyethylated, acid-modified starch (about 1.85 wt. % hydroxyethyl content, $[\eta]_0$ about 0.23 dl/g, 91.1% non-volatile matter), 650 g, was dispersed with agitation in about 975 g of water containing calcium ions, and the mixture was heated to about 98° C. and held at that temperature for about 45 minutes. The resulting starch paste was cooled to about 89° C., about 0.2 ml of α-amylase solution was added, and heating and agitation continued for about 83 minutes. About 3 g of sodium hypochlorite (about 16.5% active chlorine) was added to destroy the enzyme, and the paste was cooled to about 35° C. The starch content of the paste was about 37.6% by weight.
Part B: Preparation of Starch Copolymer
To a 2-1 stainless steel pressure reactor were added about 1076 g of the starch paste prepared according to Part A, 50 g of deionized water, and 1.0 g of ethylene diamine tetraacetic acid disodium salt. A solution of 4.1 g of potassium persulfate and 1.1 ml of 19N sodium hydroxide in 250 g of deionized water was prepared in a separate vessel connected to the reactor via a pump. A sample cylinder was charged with 247 g of styrene and 174 g of 1,3-butadiene, and was also connected to the reactor.

The reactor was purged with nitrogen for about 15 minutes, and heated to 70° C. in about 30 minutes. About 124.9 g of the initiator solution was pumped into the vessel in about 12 minutes. As this was occurring, about 11 g of the comonomer mixture was added to the reactor and the pressure was vented. Then addition of the monomer and initiator streams was started and continued for about 4.4 hours, while maintaining the temperature at 70° C. Upon completion of the monomer and initiator additions, the feed lines were flushed into the reactor with a small amount of water. Heating was continued for four hours, following which the reactor was allowed to cool to the ambient room temperature overnight.

The product was 44.5 wt. % solids and had a weight average particle size of 178 nm.

EXAMPLE 4

This example illustrates the preparation of a starch copolymer composed of about 30% by weight of starch and about 70% by weight of copolymerized styrene and 1,3-butadiene in a 60:40 wt./wt. ratio, with continuous addition of the monomer and initiator at 70° C.

Part A: Preparation of Starch Dispersion

A hydroxyethylated, acid-modified starch (about 1.85 wt. % hydroxyethyl content, $[\eta]_0$ about 0.23 dl/g, 91.1% non-volatile matter), 650 g, was dispersed with agitation in about 975 g of water containing calcium ions, and the mixture was heated to about 97° C. and held at that temperature for about 30 minutes. The resulting starch paste was cooled to about 89° C., about 0.15 ml of α-amylase solution was added, and heating and agitation continued for about 100 minutes. About 3 g of sodium hypochlorite (about 16.5% active chlorine) was added to destroy the enzyme, and the paste was cooled to about 40° C. The starch content of the paste was about 37.7% by weight.

Part B: Preparation of Starch Copolymer

To a 2-1 stainless steel pressure reactor were added about 626 g of the starch paste prepared according to Part A, 150 g of deionized water, 0.5 g of ethylene diamine tetraacetic acid disodium salt, and 8.6 g of sodium bicarbonate. A solution of 14 g of potassium persulfate in 410 g of deionized water was prepared in a separate vessel connected to the reactor via a pump. A sample cylinder was charged with 330 g of styrene and 220 g of 1,3-butadiene, and was also connected to the reactor.

The reactor was purged with nitrogen, heated to about 70° C., and about 10 g of the initiator solution was pumped into the vessel, followed by about 15 g of the comonomer mixture. The pressure in the reactor was vented. Then addition of the monomer and initiator streams was started at about 1.7 ml/min and about 1.3 ml/min, respectively, and continued for about 5.5 hours, while maintaining the temperature at 70° C. Upon completion of the monomer and initiator additions, the feed lines were flushed into the reactor with a small amount of water. Heating was continued for two hours, following which the reactor was allowed to cool to the ambient room temperature overnight.

The product had a weight average particle size of 159 nm as determined by capillary hydrodynamic fractionation.

EXAMPLE 5

COMPARATIVE EXAMPLE C

This example illustrates the preparation of a starch copolymer composed of about 50% by weight of starch and about 50% by weight of copolymerized styrene and 1,3-butadiene in a 60:40 wt./wt. ratio, by batch polymerization at 90° C.

Part A: Preparation of Starch Dispersion

A hydroxyethylated, acid-modified starch (about 1.85 wt. % hydroxyethyl content, $[\eta]_0$ about 0.23 dl/g, 91.1% non-volatile matter), 650 g, was dispersed with agitation in about 975 g of water containing calcium ions, and the mixture was heated to about 98° C. and held at that temperature for about 30 minutes. The resulting starch paste was cooled to about 89° C., about 0.2 ml of (α-amylase solution was added, and heating and agitation continued for about 84 minutes. About 3 g of sodium hypochlorite (about 16.5% active chlorine) was added to destroy the enzyme, and the paste was cooled to the ambient room temperature. The starch content of the paste was 40.3% by weight.

Part B: Preparation of Starch Copolymer

To a 2-1 stainless steel pressure reactor were added about 1055 g of the starch paste prepared according to Part A, 341 g of deionized water, 1 g of ethylene diamine tetraacetic acid disodium salt, 6.48 g of potassium persulfate, and 3.9 g of sodium bicarbonate. Then 243 g of styrene was added, the reactor was purged for 10 minutes with nitrogen, and a vacuum was applied for 10 minutes. Next, 162 g of 1,3-butadiene was added to the reactor from a sample cylinder; the pressure was about 20 psig at the ambient conditions of 21° C.

The agitator was started, and the reactor was heated according to the following schedule: ambient temperature to 60° C. in 30 minutes, 60° C. to 90° C. in five hours, held for four hours at 90° C., cooled from 90° C. to 25° C. in 30 minutes. The final product was about 44.7% solids. The weight-average particle diameter was about 185 nm as determined by capillary hydrodynamic fractionation.

EXAMPLE 6

This example illustrates the preparation of a starch copolymer composed of about 50% by weight of starch and about 50% by weight of copolymerized styrene and 1,3-butadiene in a 60:40 wt./wt. ratio, with continuous addition of the monomer and initiator at 90° C., and no pH adjustment.

Part A: Preparation of Starch Dispersion

A hydroxyethylated, acid-modified starch (about 1.85 wt. % hydroxyethyl content, $[\eta]_0$ about 0.23 dl/g, 91.1% non-volatile matter), 650 g, was dispersed with agitation in about 975 g of water containing calcium ions, and the mixture was heated to about 98° C. in about 10 minutes and held at that temperature for about 30 minutes. The resulting starch paste was cooled to about 89° C., about 0.15 ml of α-amylase solution was added, and heating and agitation continued for about 120 minutes. About 3 g of sodium hypochlorite (about 16.5% active chlorine) was added to destroy the enzyme, and the paste was cooled. The cooked paste solids were 37.9% by weight.

Part B: Preparation of Starch Copolymer

To a 2-1 stainless steel pressure reactor were added about 1014 g of the starch paste prepared according to Part A, and 0.5 g of ethylene diamine tetraacetic acid disodium salt. A solution of 6.0 g of potassium persulfate in 350 g of deionized water was prepared in a separate vessel connected to the reactor via a pump. A sample cylinder was charged with 242 g of nitrogen-purged styrene and 171 g of 1,3-butadiene, and was also connected to the reactor.

The reactor was purged with nitrogen while heating to about 50° C., then closed while further heating to about 90° C. About 6.4 g of the initiator solution was pumped into the vessel in about 4 minutes. As this was occurring, about 5 g of the comonomer mixture was added to the reactor and the pressure was vented. Then addition of the monomer and initiator streams was started and continued for about 4 hours, while maintaining the temperature at 90° C. Upon completion of the monomer and initiator additions, heating was continued for one hour, following which the reactor was cooled to 25° C. in about 30 minutes.

The product had a pH of 1.8; this was adjusted to pH 6.2 by the addition of base. The weight average particle size was 138 nm as determined by capillary hydrodynamic fractionation.

EXAMPLE 7

This example illustrates the preparation of a starch copolymer composed of about 50% by weight of starch and about 50% by weight of copolymerized styrene and 1,3-butadiene in a 60:40 wt./wt. ratio, with continuous addition of the monomer and initiator at 90° C.

Part A: Preparation of Starch Dispersion

A hydroxyethylated, acid-modified starch (about 1.85 wt. % hydroxyethyl content, $[\eta]_0$ about 0.23 dl/g, 91.1% non-volatile matter), 650 g, was dispersed with agitation in about 975 g of water containing calcium ions, and the mixture was heated to about 98° C. in about 10 minutes and held at that temperature for about 30 minutes. The resulting starch paste was cooled to about 89° C., about 0.2 ml of α-amylase solution was added, and heating and agitation continued for about 83 minutes. About 3 g of sodium hypochlorite (about 16.5% active chlorine) was added to destroy the enzyme, and the paste was cooled to about 43° C. in 15 minutes.

Part B: Preparation of Starch Copolymer

To a 2-1 stainless steel pressure reactor were added about 1043 g of the starch paste prepared according to Part A, 50 g of deionized water, and 1.0 g of ethylene diamine tetraacetic acid disodium salt. A solution of 4.1 g of potassium persulfate and 1.1 ml of 19N sodium hydroxide in 250 g of deionized water was prepared in a separate vessel connected to the reactor via a pump. A sample cylinder was charged with 249 g of styrene and 174 g of 1,3-butadiene, and was also connected to the reactor.

The reactor was purged with nitrogen while heating to 50° C., and a 5–10 psig nitrogen head was maintained while further heating the reactor to 89° C. About 60 g of the initiator solution was pumped into the vessel in about 10 minutes. As this was occurring, about 10 g of the comonomer mixture was added to the reactor and the reactor pressure was vented to 5 psig. Then addition of the monomer and initiator streams was started and continued for about 5 hours, while maintaining the temperature at 90° C. Upon completion of the monomer and initiator additions, the feed lines were flushed into the reactor with a small amount of water. Heating was continued for three hours, following which the reactor was cooled to 25° C. in about 30 minutes.

The product was 44.0 wt % solids, and had a pH of 5.2 and a weight average particle size of 149 nm as determined by capillary hydrodynamic fractionation.

EXAMPLE 8

This example illustrates the preparation of a starch copolymer composed of about 40% by weight of starch and about 60% by weight of copolymerized styrene and 1,3-butadiene in a 60:40 wt./wt. ratio, with continuous addition of the monomer and initiator at 90° C.

Part A: Preparation of Starch Dispersion

A hydroxyethylated, acid-modified starch (about 1.85 wt. % hydroxyethyl content, $[\eta]_0$ about 0.23 dl/g, 91.1% non-volatile matter), 650 g, was dispersed with agitation in about 975 g of water containing calcium ions, and the mixture was heated to about 98° C. and held at that temperature for about 45 minutes. The resulting starch paste was cooled to about 89° C., about 0.2 ml of α-amylase solution was added, and heating and agitation continued for about 82 minutes. About 3 g of sodium hypochlorite (about 16.5% active chlorine) was added to destroy the enzyme, and the paste was cooled to about 40° C.

Part B: Preparation of Starch Copolymer

To a 2-1 stainless steel pressure reactor were added about 825 g of the starch paste prepared according to Part A, 150 g of deionized water, and 1.0 g of ethylene diamine tetraacetic acid disodium salt. A solution of 6.9 g of potassium persulfate and 1.8 ml of 19N sodium hydroxide in 300 g of deionized water was prepared in a separate vessel connected to the reactor via a pump. A sample cylinder was charged with 292 g of styrene and 196 g of 1,3-butadiene, and was also connected to the reactor.

The reactor was heated to 90° C., and about 75 g of the initiator solution was pumped into the vessel in about 10 minutes. As this was occurring, about 13 g of the comonomer mixture was added to the reactor and the pressure was vented to 5 psig. Then addition of the monomer and initiator streams was started and continued for about 4 hours, while maintaining the temperature at 90° C. Upon completion of the monomer and initiator additions, the feed lines were flushed into the reactor with a small amount of water. Heating was continued for three hours, following which the reactor was cooled to 25° C. in about 30 minutes.

The product had a weight average particle size of 151 nm as determined by capillary hydrodynamic fractionation.

EXAMPLE 9

This example illustrates the preparation of a starch copolymer composed of about 10% by weight of starch and about 90% by weight of polymerzed butyl acrylate, methyl methacrylate, and acrylic acid in a 38:60:2 weight ratio, with continuous addition of the monomer and initiator at 85–90° C.

Part A: Preparation of Starch Dispersion

A hydroxyethylated, acid-modified starch (about 1.85 wt. % hydroxyethyl content, $[\eta]_0$ about 0.23 dl/g, 91.1% non-volatile matter), 275 g, was dispersed with agitation in about 414 g of water containing calcium ions, and the mixture was heated to about 98° C. and held at that temperature for about 45 minutes. The resulting starch paste was cooled to about 89° C., about 0.08 ml of α-amylase solution was added, and heating and agitation continued for about 80 minutes. About 1.5 g of sodium hypochlorite (about 16.5% active chlorine) was added to destroy the enzyme, and the paste was cooled to about 30° C.

Part B: Preparation of Starch Copolymer

To a 1-1 glass reactor were added about 97 g of the starch paste prepared according to Part A, 250 g of deionized water, 0.3 g of ethylene diamine tetraacetic acid disodium salt, and 0.2 g of sodium bicarbonate. A solution of 1.5 g of potassium persulfate and 1.0 g of sodium bicarbonate in 200 g of deionized water was prepared in a separate vessel connected to the reactor via a pump. A second separate vessel was charged with 133 g of n-butyl acrylate, 207 g of methyl methacrylate, and 7 g of acrylic acid, and was also connected to the reactor.

The reactor was purged and heated to 80° C., and about 1.5 g of potassium persulfate dissolved in 20 g of water was added. Then addition of the monomer and initiator streams was started and continued for about three hours, while the temperature was increased to 90° C. Heating was continued for one hour, following which the reactor was cooled to ambient room temperature.

The product had a weight average particle size of 166 nm as determined by capillary hydrodynamic fractionation.

EXAMPLE 10

This example illustrates the preparation of a starch copolymer composed of about 5% by weight of starch and about 95% by weight of polymerized butyl acrylate, methyl methacrylate, and acrylic acid in a weight ratio of about 38:60:2 with continuous addition of the monomer and initiator at 85–90° C.

Part A: Preparation of Starch Dispersion

A hydroxyethylated, acid-modified starch (about 1.85 wt. % hydroxyethyl content, $[\eta]_0$ about 0.23 dl/g, 91.1% nonvolatile matter), 600 g, was dispersed with agitation in about 970 g of water containing calcium ions, and the mixture was heated to about 98° C. and held at that temperature for about 45 minutes. The resulting starch paste was cooled to about 89° C., about 0.2 ml of α-amylase solution was added, and heating and agitation continued for about 81 minutes. About 1.5 g of sodium hypochlorite (about 16.5% active chlorine) was added to destroy the enzyme, and the paste was cooled to about 38° C.

Part B: Preparation of Starch Copolymer

To a 1-1 glass reactor were added about 45 g of the starch paste prepared according to Part A, 350 g of deionized water, and 0.3 g of ethylene diamine tetraacetic acid disodium salt. A solution of 1.5 g of potassium persulfate in 200 g of deionized water was prepared in a separate vessel connected to the reactor via a pump. A second separate vessel was charged with 133 g of n-butyl acrylate, 207 g of methyl methacrylate, and 7 g of acrylic acid, and was also connected to the reactor.

The reactor was purged and heated to 80° C., and about 0.5 g of potassium persulfate dissolved in 10 g of water was added. Then addition of the monomer and initiator streams was started and continued for about seven hours, while the temperature was increased to 89° C. Heating was then discontinued, and the reactor was allowed to cool to ambient room temperature overnight.

The product had a weight average particle size of 158 nm as determined by capillary hydrodynamic fractionation.

As the data in Table 1 below shows, the process herein described yields starch copolymer dispersions of significantly smaller particle size than those prepared by batch polymerization techniques, especially at the higher temperature of 90° C.

TABLE 1

| Example | Starch Copolymer | Process | Temperature ° C. | Particle Size nm |
|---|---|---|---|---|
| 1 | S/B | batch | 70 | 215 |
| 2 | SIB | batch | 70 | 185 |
| 3 | S/B | continuous add | 70 | 178 |
| 4 | S/B | continuous add | 70 | 159 |
| 5 | S/B | batch | 90 | 185 |
| 6 | S/B | continuous add | 90 | 138 |
| 7 | S/B | continuous add | 90 | 149 |
| 8 | S/B | continuous add | 90 | 151 |
| 9 | BA/MMA/AA | continuous add | 90 | 166 |
| 10 | BA/MMA/AA | continuous add | 90 | 158 |

EXAMPLE 11

COMPARATIVE EXAMPLE

This example illustrates the preparation of a starch copolymer composed of about 10% by weight of starch and about 90% by weight of copolymerized butyl acrylate, methyl methacrylate, methacrylic acid and methacrylamidoethylethyleneurea in a weight ratio of about 52:46:1:1 by continuous addition of the monomers and initiator solution at about 80° C.

Part A: Preparation of Starch Dispersion

A hydroxyethylated, acid-modified starch (about 1.85 wt. % hydroxyethyl content, $[\eta]_0$ about 0.23 dl/g, 91.1% nonvolatile matter), 650 g, was dispersed with agitation in about 975 g of water containing calcium ions, and the mixture was heated to about 97° C. and held and that temperature for about 36 minutes. The resulting starch paste was cooled to about 89° C., about 0.2 ml of α-amylase solution was added, and heating and agitation continued for about 83 minutes. About 3 g of sodium hypochlorite (about 16.5% active chlorine) was added to destroy the enzyme and the paste was cooled to about 40° C. The starch content of the paste was 37.8% by weight and $[\eta]_0$ about 0.08 dl/g.

Part B: Preparation of Starch Copolymer

To a 1-1 glass reactor were added about 180 g of deionized water, about 95 g of starch paste (about 35.9 g of dry starch), and 0.3 g of ethylene diamine tetraacetic acid disodium salt. The reactor was purged with $N_2$ and heated to 80° C. At about 80° C., about 0.5 g of potassium persulfate were added under constant stirring and $N_2$ purging. After 15 minutes, a mixture of about 126 g of butyl acrylate and about 204 g of methyl methacrylate, a mixture of 105 g of water and about 14.7 g of Sipomer® WAM II (Rhône-Poulenc, 46.3% of methacrylamidoethylethyleneurea and 24.5% of methacrylic acid in water), and initiator streams were started while the temperature was kept at 79–82° C. The addition of both the monomer and the initiator solutions was continued for about four hours. The reactor temperature was brought to 85° C. within 30 min. Heating was then discontinued and the reactor was cooled to room temperature by passing water through the reactor jacket. The reactor content was filtered through a 63 μm stainless steel screen. About 826 g of latex was formed, with dry substance content of about 38.39%. pH of the product was 1.35 and was adjusted to pH 6.7 with $NaHCO_3$. Three drops of Kathon® LX 1.5% biocide were added to prevent mildew growth. About 30 g of coagulum was formed, both precipitated or deposited on the blades of the reactor impeller.

Part C: Water Sensitivity Test

About 45 g of the above liquid product was combined under constant stirring with about 5.6 g of an emulsion containing about 31.21 parts of "Texanol" Ester Alcohol (Eastman; 2,2,4-trimethyl-1,3-pentanediol monoisobutyrate), about 3.12 parts of Igepal CO-630 surfactant (Rhône-Poulenc) and the rest water. The ratio copolymer/Texanol was about 10/1. A film of the mixture was cast on Mylar® polyester sheet using a 20-mil wirewound rod, and was allowed to dry for at least 24 hours at 72° F. and 50% relative humidity. A strip of Mylar® polyester sheet with the transparent film on it was cut off and immersed into water in a beaker for at least 7 hours. It was found that a permanent discoloration of the film occurred. The wet film was easily destroyed by scrubbing it with a soft applicator covered with rubber.

EXAMPLE 12

This example illustrates the preparation of a starch copolymer composed of about 4% by weight of starch and about 96% by weight of polymerized butyl acrylate, methyl methacrylate, methacrylic acid and methacrylamidoethylethyleneurea in a weight ratio of about 52:46:1:1 with addition of the monomer-starch emulsion and initiator solution at 80–85° C.

Part A: Preparation of Starch Dispersion

A hydroxyethylated, acid-modified starch (about 1.85 wt. % hydroxyethyl content, $[\eta]_0$ about 0.23 dl/g, 91.1% nonvolatile matter), 650 g, was dispersed with agitation in about 975 g of water containing calcium ions, and the mixture was heated to about 98° C. and held at that temperature for about 45 minutes. The resulting starch paste was cooled to about 89° C., about 0.2 ml of α-amylase solution was added, and heating and agitation continued for about 83 minutes. About 1.5 g of sodium hypochlorite (about 16.5% active chlorine) was added to destroy the enzyme, and the paste was cooled to about 38° C.

Part B: Preparation of Starch-Monomer Emulsion and Potassium Persulfate Solution To a 1-1 glass beaker were added about 40 g of the starch paste prepared according to Part A, 99 g of deionized water, 8.39 g of Sipomer® WAM II (Rhône-Poulenc, 46.3% of methacrylamidoethylethyleneurea and 24.5% of methacrylic acid in water), 17.5 g Rhodacal DS-4 (Rhône-Poulenc, containing about 3.8 g sodium dodecylbenzene sulfonate in water), 200 g of methyl methacrylate, 177 g of butyl acrylate, and 2 g of methacrylic acid. The mixture was purged with nitrogen and an emulsion was generated using an Ultra-Turrax T 50 homogenizer, with agitation at 6000 rpm for 5 minutes under constant nitrogen purge. The beaker was then connected to the reactor via a pump. A solution of 1.83 g of potassium persulfate in about 75 g of deionized water was prepared in a separate vessel connected to the reactor via another pump.

Part C: Preparation of Starch Copolymer

To a 1-1 glass reactor were added about 200 g of deionized water and 0.1 g of ethylene diamine tetraacetic acid disodium salt. The reactor was purged and heated to 80° C., and about 18.6 g of potassium persulfate solution and 10 g of the emulsion were added under constant stirring. After 15 minutes, the addition of the emulsion and initiator steams was started while the temperature was kept at 79–82° C. After about 105 minutes on stream, a solution of 0.54 g of sodium hydrogen carbonate in 60 ml of deionized water was added to the reactor. At the same time, 0.54 g of sodium hydrogen carbonate was added to the vessel containing the solution of potassium persulfate and dissolved in it. The addition of both the emulsion and the initiator solution was continued for about four hours. The reactor temperature was brought to about 85° C. within 30 minutes. Heating was then discontinued, and the reactor was allowed to cool to ambient room temperature overnight. The reactor content was filtered through a 63 μm stainless steel screen. About 800 g of white latex was formed, with dry substance content of about 46.31%. About 2 g of coagulum was collected. pH of the product was 4.6 and was adjusted to pH about 8.2 with concentrated aqueous ammonia. Three drops of Kathon® LX 1.5% Biocide (Rohm and Haas Co.) were added, to prevent mildew growth.

The product had a weight average particle size of 290 nm, as measured by the capillary hydrodynamic fractionation (CHDF) technique using CHDF-1100 Particle Size Analyzer from MATEC Applied Sciences.

Part D: Water Sensitivity Test 50 g of the product was mixed with 7.8 g of an emulsion containing about 2.44 g of Texanol, 0.24 g of Igepal CO-630 surfactant and the rest water. A film of the mixture was cast on Mylar® polyester sheet using a 20-mil wire-wound rod, and was allowed to dry for at least 24 hours at 72° F. and 50% relative humidity. The film was then placed into water for 24 hours. No visible changes in the film appearance were observed either in water or after drying overnight at room temperature. Scrubbing the wet film with a soft applicator covered with rubber neither removed the film from the Mylar sheet nor led to any visible damage of the film integrity.

EXAMPLE 13

This example illustrates the preparation of a starch copolymer composed of about 10% by weight of starch and about 90% by weight of polymerized butyl acrylate, methyl methacrylate, methacrylic acid and methacrylamidoethylethyleneurea in a weight ratio of about 52:46:1:1, with addition of the monomer-starch emulsion and initiator solution at about 80° C.

Part A: Preparation of Starch Dispersion

A hydroxyethylated, acid-modified starch (about 1.85 wt. % hydroxyethyl content, $[\eta]_0$ about 0.23 dl/g, 91.1% nonvolatile matter), 650 g, was dispersed with agitation in about 975 g of water containing calcium ions, and the mixture was heated to about 98° C. and held at that temperature for about 45 minutes. The resulting starch paste was cooled to about 89° C., about 0.2 ml of α-amylase solution was added and heating and agitation continued for about 83 minutes. About 3 g of sodium hypochlorite (about 16.5% active chlorine) was added to destroy the enzyme and the paste was cooled to about 38° C.

Part B: Preparation of Starch-Monomer Emulsion and Potassium Persulfate Solution To a 1-1 glass beaker were added about 105 g of the starch paste prepared according to Part A, 139 g of deionized water, 8.39 g of Sipomer® WAM II (Rhône-Poulenc, 46.3% of methacrylamidoethylethyleneurea and 24.5% of methacrylic acid in water), 33.5 g Rhodacal DS-4, 200 g of methyl methacrylate, 177 g of butyl acrylate, and 2 g of methacrylic acid. The mixture was purged with nitrogen and an emulsion was generated using an Ultra-Turrax T50 homogenizer, with agitation at 6000 rpm for 5 minutes and under a constant nitrogen flow through the emulsion. The beaker was later connected to the reactor via a pump and the emulsion was kept under nitrogen flow and constant stirring. A solution of 1.83 g of potassium persulfate and 1.08 g of sodium hydrogen carbonate in about 75 g of deionized water was prepared in a separate vessel connected to the reactor via another pump.

Part C: Preparation of Starch Copolymer

To a 1-1 glass reactor were added about 161 g of deionized water and 0.1 g of ethylene diamine tetraacetic acid disodium salt. The reactor was purged and heated to 80° C., and about 19.1 g of potassium persulfate solution and about 11.8 g of the emulsion were added under constant stirring. After 15 minutes, the addition of the emulsion and initiator streams was started while the temperature was kept at 81–82° C. The addition of both the emulsion and the initiator solution was continued for about three hours, then the reactor temperature was brought to 85° C. within 40 minutes. Heating was then discontinued and the reactor was cooled to ambient room temperature. The reactor content was filtered through a 63 μm stainless steel screen. About 890 g of white latex was collected, with dry substance content of about 48.32%. About 1.7 g of coagulum was collected. The resulting pH was 5.1. The product was brought to pH 8 by the addition of concentrated aqueous ammonia. Three drops of Kathon® LX 1,5% biocide were added to prevent mildew growth.

The product had a weight average particle size of 200 nm as measured by the capillary hydrodynamic fractionation (CHDF) technique using the CHDF-1100 Particle Size Analyzer from MATEC Applied Sciences.

Part D: Water Sensitivity Test 50 g of the product was mixed with 7.8 g of an emulsion containing 2.44 g of Texanol, 0.24 g of Igepal CO-630 surfactant and the rest water. A film of the mixture was cast on Mylar polyester sheet using a 20-mil wire-wound rod and was allowed to dry for at least 24 hours at 72° F. and 50% relative humidity. The film was then placed into water for 24 hours. Slight haziness of the film that appeared after the soaking in water completely disappeared after drying the film overnight at room temperature. Scrubbing the wet film with a soft applicator covered with rubber neither removed the film from the Mylar® sheet nor led to any visible damage of the film integrity.

EXAMPLE 14

According to this example, the starch copolymer products of various of the preceding examples were used as binders in a standard latex paint formulation to determine their effect on water resistance, gloss and open time. Specifically, a paint formulation was prepared comprising about 16.7 parts by weight of Ti-Pure® R706 titanium dioxide pigment (DuPont), about 0.66 parts Tamol 731 (Rohm & Haas) dispersant, about 0.34 parts Igepal CO-630 non-ionic surfactant, about 3.34 parts Texanol coalescent, about 3.82 parts Acrysol® RM2020 thickener (Rohm and Haas), from 45.3–56.6 parts of the experimental latex of the invention and bout 29.88–23.90 parts water.

The resulting paints were tested for water resistance by measuring the number of wet scrub cycles according to ASTM test D2486 wherein the formulated paint is applied over a primer on a test card and allowed to dry for 7 days before testing. Gloss was measured by means of ASTM D523 at 20° and 60° angles and Open time was measured according to the method wherein a paint film of less than about 5 mils is drawn on a black test card using a doctor blade. An "X" is marked in the paint film, through the wet coating to the test card base. At specified time intervals (e.g., 3, 6, 9 and 12 minutes) a second film is drawn at 90° to the first film. After drying, the film is examined visually. The open time is defined by the interval between the last sample (drawdown) that shows adequate leveling and the first that is unsatisfactory. The results of these tests are compared against a paint formula comprising R&H Rhoplex® HG95 acrylic latex as a standard paint binder and are set out in Table 2 below:

TABLE 2

| Example | Particle Size (nm) | Wet Scrub cycles | 20°/60° Gloss % | Open Time min. |
|---|---|---|---|---|
| 9 | 166 | <100 | 38/77 | 12–15 |
| 10 | 158 | 370 | na | na |
| 11 | na | 1000+ | 20/48 | poor |
| 12 | 290 | 1000+ | 58/86 | 12–13 |
| 13 | 200 | 1000+ | 52/83 | 10–12 |
| Control | <100 | 1000+ | 54/81 | 4–6 |

These results show that the addition of a wet adhesion monomer in combination with other reactive monomers to the starch solution in the conventional manner after mixture of the starch and initiator provides substantial improvements in wet rub resistance as is shown by the results of Example 11 compared with Examples 9 and 10 which lack the wet adhesion monomer, but that gloss and open time are reduced. The results of example 12 and 13 demonstrate that gloss and open time are regained by practice of the method of the invention wherein the wet adhesion monomer and the rest of the monomers are pre-emulsified with the starch paste.

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

We claim:

1. A method for the preparation of a starch copolymer product which is the reaction product of starch and one or more synthetic monomers capable of undergoing free radical polymerization wherein said reaction product is in the form of an emulsion or dispersion having weight-average particle sizes less than 180 nm as measured by Capillary Hydrodynamic Fractionation comprising the steps of:
    (a) dissolving or colloidally dispersing starch in an aqueous solvent to form a starch solution or dispersion;
    (b) heating the starch solution or dispersion to a specified temperature range;
    (c) adding to the starch solution or dispersion a first portion of said synthetic monomer and a free radical initiator for initiation of polymerization of the starch component and said synthetic monomer; and
    (d) after free radical polymerization of said synthetic monomers has been initiated in the presence of said starch, adding additional portions of synthetic monomer capable of undergoing free radical polymerization to the starch solution or dispersion wherein at least 75% of the total synthetic monomer to be reacted with said starch is added more than one hour after initiation of said free radical polymerization.

2. The method of claim 1 wherein at least 50% of the total synthetic monomer to be reacted with said starch is added more than 2 hours after initiation of said free radical polymerization.

3. The method of claim 1 wherein between 50% and 75% of the total synthetic monomer to be reacted with said starch is added more than 2 hours after initiation of said free radical polymerization.

4. The method of claim 1 wherein the starch is a member selected from the group consisting of starch, modified starch and starch derivatives derivatized by a member selected from the group consisting of ether, hydroxyether, organic acid ester, carboxylate, ketone, aldehyde, ketal, acetal, amide, quaternary ammonium, sulfate and phosphate groups.

5. The method of claim 1 wherein after step (a) the starch is modified by a method selected from the group consisting of acid hydrolysis, enzymatic hydrolysis and oxidation.

6. The method according to claim 4 wherein the starch is a starch derivative the molecular weight of which is modified to a molecular weight, as measured by the intrinsic viscosity in water at 25° C., in the range of $[\eta]_0=0.16$–$0.35$ dl/g.

7. The method according to claim 1 wherein said synthetic monomers are selected from the group consisting of α-olefins, conjugated and nonconjugated dienes, vinyl aromatic compounds, acrylic acid, methacrylic acid, itaconic acid, $C_1$ to $C_{18}$ esters of acrylic, methacrylic, and itaconic acid, behenyl ethoxyl methacrylate, vinyl esters of $C_1$ to $C_{18}$ organic acids, acrylonitrile, acrylamide, $C_1$–$C_{18}$ N-substituted and N,N-disubstituted acrylamides, and methacrylamidoethylethyleneurea.

8. The method according to claim 1 wherein the synthetic monomers are selected from the group consisting of styrene, 1,3-butadiene, butyl acrylate, ethyl acrylate, methyl methacrylate, acrylic acid, methacrylic acid, and methacrylamidoethylethyleneurea.

9. The method according to claim 1 wherein the initiator is a peroxydisulfate.

10. The method according to claim 1 wherein a wet adhesion monomer is added to the starch solution or dispersion.

11. The method of claim 12 wherein said wet adhesion monomer is selected from the group consisting of a blend of methacrylamidoethylethyleneurea and of methacrylic acid, and behenyl ethoxyl methacrylate.

12. A starch copolymer product produced according to the method of claim 1.

13. An industrial or architectural coating composition comprising the product of claim 13 as a binder.

14. The coating composition of claim 13 which is selected from the group consisting of paints, varnishes, and stains.

15. A binder for paper products comprising the starch copolymer product of claim 12.

16. The binder of claim 15 which is selected from the group consisting of surface sizing binders and coating binders.

17. An adhesive comprising the product of claim 12 as a binder.

18. In a method for the preparation of a starch copolymer product which is the reaction product of starch and one or more synthetic monomers capable of undergoing free radical polymerization comprising the steps of:

(a) dissolving or colloidally dispersing starch in an aqueous solvent to form a starch solution or dispersion;

(b) adding to the starch solution or dispersion at least one synthetic monomer and a free radical initiator for initiation of polymerization of the starch component and said synthetic monomer; and (c) carrying out a free radical polymerization of said monomers in the presence of said starch; the improvement comprising:

blending a wet adhesion monomer with said starch solution or dispersion prior to adding the free radical initiator to said starch solution or dispersion.

19. The method of claim 18 wherein the starch and aqueous solvent are heated to promote formation of said solution or dispersion and the solution or dispersion is cooled to a specified temperature range prior to blending the wet adhesion monomer.

20. The method of claim 18 wherein a surfactant is blended with said wet adhesion monomer and said starch solution.

21. The method of claim 18 wherein the wet adhesion monomer comprises a blend of methacrylamidoethylethyleneurea and of methacrylic acid.

22. The method of claim 18 wherein the wet adhesion monomer is behenyl ethoxyl methacrylate.

23. The method of claim 18 wherein the wet adhesion monomer comprises from 0.5 to 10% by weight of the total synthetic monomer charge.

24. The method of claim 18 wherein the wet adhesion monomer comprises from 1 to 7% of the total synthetic monomer charge.

25. The method of claim 18 wherein the starch is a member selected from the group consisting of starch, modified starch and starch derivatives derivatized by a member selected from the group consisting of ether, hydroxyether, organic acid ester, carboxylate, ketone, aldehyde, ketal, acetal, amide, quaternary ammonium, sulfate and phosphate groups.

26. The method according to claim 18 wherein said synthetic monomers are selected from the group consisting of $\alpha$-olefins, conjugated and nonconjugated dienes, vinyl aromatic compounds, acrylic acid, methacrylic acid, itaconic acid, $C_1$ to $C_{18}$ esters of acrylic, methacrylic, and itaconic acid, vinyl esters of $C_1$ to $C_{18}$ organic acids, acrylonitrile, acrylamide, $C_1$–$C_{18}$ N-substituted and N,N-disubstituted acrylamides, behenyl ethoxyl methacrylate and methacrylamidoethylethyleneurea.

27. The method according to claim 18 wherein the synthetic monomers are selected from the group consisting of styrene, 1,3-butadiene, butyl acrylate, ethyl acrylate, acrylic acid, methyl methacrylate, methacrylic acid, and methacrylamidoethylethyleneurea.

28. A starch copolymer product produced according to the method of claim 18.

29. An industrial or architectural coating composition comprising the product of claim 28 as a binder.

30. The coating composition of claim 29 which is selected from the group consisting of paints, varnishes, and stains.

31. A binder for paper products comprising the starch copolymer product of claim 28.

32. The binder of claim 31 which is selected from the group consisting of surface sizing binders and coating binders.

33. An adhesive comprising the product of claim 28 as a binder.

34. An industrial or architectural coating composition comprising as a binder therein a starch copolymer product which is the reaction product of starch and one or more synthetic monomers capable of undergoing free radical polymerization wherein said reaction product is in the form of an emulsion or dispersion having weight average particle sizes greater than 120 nm as measured by Capillary Hydrodynamic Fractionation.

35. The coating composition of claim 34 which is selected from the group consisting of paints, varnishes and stains.

36. The coating composition of claim 34 wherein the starch is a member selected from the group consisting of starch, modified starch and starch derivatives derivatized by a member selected from the group consisting of ether, hydroxyether, organic acid ester, carboxylate, ketone, aldehyde, ketal, acetal, amide, quaternary ammonium, sulfate and phosphate groups.

37. The coating composition according to claim 34 wherein said synthetic monomers are selected from the group consisting of $\alpha$-olefins, conjugated and nonconjugated dienes, vinyl aromatic compounds, acrylic acid, methacrylic acid, itaconic acid, $C_1$ to $C_{18}$ esters of acrylic, methacrylic, and itaconic acid, vinyl esters of $C_1$ to $C_{18}$ organic acids, acrylonitrile, acrylamide, $C_1$–$C_{18}$ N-substituted and N,N-disubstituted acrylamides, and methacrylamido-ethylethyleneurea.

38. The coating composition according to claim 34 wherein the synthetic monomers are selected from the group consisting of styrene and 1,3-butadiene butyl acrylate, ethyl acrylate, acrylic acid, methyl methacrylate, methacrylic acid, and methacrylamidoethylethyleneurea.

* * * * *

UNITED STATES PATENT AND TRADEMARK OFFICE
CERTIFICATE OF CORRECTION

PATENT NO. : 6,040,379
DATED : March 21, 2000
INVENTOR(S) : Luebke et al.

Page 1 of 1

It is certified that error appears in the above-identified patent and that said Letters Patent is hereby corrected as shown below:

Column 19,
Line 16, "claim 13" should be -- claim 12 --.

Signed and Sealed this

Thrity-first Day of July, 2001

*Attest:*

*Nicholas P. Godici*

*Attesting Officer*

NICHOLAS P. GODICI
*Acting Director of the United States Patent and Trademark Office*